US009663640B2

(12) United States Patent
Bédard et al.

(10) Patent No.: US 9,663,640 B2
(45) Date of Patent: *May 30, 2017

(54) RUBBER COMPOSITIONS AND USES THEREOF

(71) Applicant: SOUCY TECHNO INC., Sherbrooke (CA)

(72) Inventors: François Bédard, Sherbrooke (CA); Denis Dubé, Sherbrooke (CA); Lyle MacDonald, Sherbrooke (CA); Jean-Damien Coué, Sherbrooke (CA)

(73) Assignee: SOUCY TECHNO INC., Sherbrooke (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/035,095

(22) PCT Filed: Dec. 19, 2014

(86) PCT No.: PCT/CA2014/000913
§ 371 (c)(1),
(2) Date: May 6, 2016

(87) PCT Pub. No.: WO2015/089647
PCT Pub. Date: Jun. 25, 2015

(65) Prior Publication Data
US 2016/0280895 A1    Sep. 29, 2016

Related U.S. Application Data

(60) Provisional application No. 61/918,035, filed on Dec. 19, 2013.

(51) Int. Cl.
| | | |
|---|---|---|
| C08L 11/00 | (2006.01) | |
| C08J 3/20 | (2006.01) | |
| C08K 3/04 | (2006.01) | |
| C08K 3/36 | (2006.01) | |
| C08K 7/02 | (2006.01) | |
| C08J 3/22 | (2006.01) | |

(52) U.S. Cl.
CPC ............... *C08L 11/00* (2013.01); *C08J 3/20* (2013.01); *C08J 3/226* (2013.01); *C08K 3/04* (2013.01); *C08K 3/36* (2013.01); *C08K 7/02* (2013.01); *C08J 2321/00* (2013.01)

(58) Field of Classification Search
CPC ....................................................... C08L 11/00
See application file for complete search history.

(56) References Cited

U.S. PATENT DOCUMENTS

| | | | |
|---|---|---|---|
| 4,587,280 A | 5/1986 | Guha et al. | |
| 6,359,045 B1 | 3/2002 | Jeske et al. | |
| 7,244,407 B2 | 7/2007 | Chen et al. | |
| 7,785,669 B2 | 8/2010 | Wang et al. | |
| 8,329,257 B2 | 12/2012 | Larouche et al. | |
| 8,535,570 B2 | 9/2013 | Hermant et al. | |
| 8,920,682 B2 | 12/2014 | Texter | |
| 2004/0173295 A1 | 9/2004 | Zanzig et al. | |
| 2006/0142455 A1 | 6/2006 | Agarwal et al. | |
| 2007/0255002 A1 | 11/2007 | Alba | |
| 2009/0202764 A1 | 8/2009 | Tonon et al. | |
| 2009/0208708 A1 | 8/2009 | Wei et al. | |
| 2009/0224598 A1 | 9/2009 | St-Amant et al. | |
| 2010/0122642 A1 | 5/2010 | Farrugia et al. | |
| 2010/0124713 A1 | 5/2010 | Farrugia et al. | |
| 2010/0184346 A1 | 7/2010 | Qi et al. | |
| 2010/0234514 A1 | 9/2010 | Noguchi et al. | |
| 2011/0014466 A1 | 1/2011 | Hu et al. | |
| 2011/0146859 A1 | 6/2011 | Schmitz et al. | |
| 2011/0156355 A1 | 6/2011 | Noguchi et al. | |
| 2012/0112133 A1 | 5/2012 | Bahnmüller et al. | |
| 2012/0183770 A1 | 7/2012 | Bosnyak et al. | |
| 2012/0207525 A1 | 8/2012 | Kim et al. | |
| 2013/0261221 A1 | 10/2013 | Bosnyak et al. | |
| 2013/0281612 A1 | 10/2013 | Bosnyak et al. | |
| 2013/0341538 A1 | 12/2013 | Huang | |

FOREIGN PATENT DOCUMENTS

| | | |
|---|---|---|
| CA | 1338446 | 7/1987 |
| CA | 1339435 | 11/1987 |
| CA | 1337834 | 12/1988 |
| CA | 1338304 | 1/1989 |
| CA | 2081636 | 5/1993 |
| CA | 2122347 | 5/1993 |
| CA | 2084117 | 9/1993 |
| CA | 2094476 | 10/1993 |
| CA | 2110285 | 10/1993 |
| CA | 2097464 | 12/1993 |
| CA | 2101129 | 1/1994 |
| CA | 2100979 | 2/1994 |
| CA | 2106795 | 3/1994 |
| CA | 2088814 | 4/1994 |

(Continued)

OTHER PUBLICATIONS

English Abstract of CN102634092(A), "Fiber filled anti-ablation hydrogenated nitrile-butadiene rubber", published on Aug. 15, 2012.

(Continued)

*Primary Examiner* — Michael Pepitone
(74) *Attorney, Agent, or Firm* — Bereskin & Parr LLP/S.E.N.C.R.L., s.r.l.

(57) ABSTRACT

There are provided rubber compositions comprising an elastomer comprising polychloroprene; reinforcing fibers chosen from aramid fibers, carbon fibers, polyester fibers, glass fibers, nylon fibers and mixtures thereof, and/or nanometric filamentary structures chosen from nanowires, nanorods, nanofibers, nanoribbons, nanotubes and mixtures thereof, said nanometric filamentary structures being functionalized or unfunctionalized; and a filler chosen from carbon black and silica. These compositions, when cured, comprises at least one set of characteristics chosen from those described in the application.

22 Claims, No Drawings

(56) References Cited

FOREIGN PATENT DOCUMENTS

| | | |
|---|---|---|
| CA | 2088817 | 4/1994 |
| CA | 2109279 | 5/1994 |
| CA | 2109663 | 6/1994 |
| CA | 2110789 | 6/1994 |
| CA | 2111143 | 6/1994 |
| CA | 2111615 | 7/1994 |
| CA | 2113743 | 8/1994 |
| CA | 2105334 | 10/1994 |
| CA | 2160535 | 10/1994 |
| CA | 2104528 | 11/1994 |
| CA | 2163209 | 11/1994 |
| CA | 2104529 | 12/1994 |
| CA | 2104537 | 12/1994 |
| CA | 2166681 | 1/1995 |
| CA | 2108772 | 2/1995 |
| CA | 2108763 | 3/1995 |
| CA | 2118778 | 3/1995 |
| CA | 2171466 | 3/1995 |
| CA | 2144933 | 9/1995 |
| CA | 2145736 | 10/1995 |
| CA | 2145810 | 10/1995 |
| CA | 2125736 | 11/1995 |
| CA | 2129281 | 11/1995 |
| CA | 2143129 | 1/1996 |
| CA | 2144560 | 1/1996 |
| CA | 2134834 | 3/1996 |
| CA | 2138609 | 3/1996 |
| CA | 2138726 | 3/1996 |
| CA | 2154633 | 7/1996 |
| CA | 2166568 | 7/1996 |
| CA | 2154636 | 9/1996 |
| CA | 2154859 | 9/1996 |
| CA | 2160637 | 9/1996 |
| CA | 2171392 | 10/1996 |
| CA | 2171393 | 10/1996 |
| CA | 2173550 | 10/1996 |
| CA | 2158107 | 11/1996 |
| CA | 2158003 | 12/1996 |
| CA | 2160324 | 12/1996 |
| CA | 2160333 | 12/1996 |
| CA | 2157260 | 3/1997 |
| CA | 2184932 | 3/1997 |
| CA | 2194639 | 8/1997 |
| CA | 2180699 | 9/1997 |
| CA | 2180898 | 9/1997 |
| CA | 2181428 | 9/1997 |
| CA | 2253548 | 11/1997 |
| CA | 2207530 | 12/1997 |
| CA | 2201440 | 1/1998 |
| CA | 2209449 | 3/1998 |
| CA | 2206280 | 5/1998 |
| CA | 2228987 | 9/1998 |
| CA | 2230624 | 9/1998 |
| CA | 2234815 | 10/1998 |
| CA | 2236991 | 11/1998 |
| CA | 2241793 | 1/1999 |
| CA | 2244796 | 2/1999 |
| CA | 2245355 | 3/1999 |
| CA | 2245770 | 3/1999 |
| CA | 2246038 | 3/1999 |
| CA | 2257002 | 6/1999 |
| CA | 2310131 | 6/1999 |
| CA | 2260340 | 7/1999 |
| CA | 2260924 | 9/1999 |
| CA | 2272375 | 12/1999 |
| CA | 2318756 | 6/2000 |
| CA | 2203617 | 8/2000 |
| CA | 2296804 | 9/2000 |
| CA | 2297505 | 9/2000 |
| CA | 2301788 | 11/2000 |
| CA | 2309287 | 12/2000 |
| CA | 2195226 | 2/2001 |
| CA | 2312452 | 3/2001 |
| CA | 2314015 | 3/2001 |
| CA | 2314017 | 3/2001 |
| CA | 2316011 | 4/2001 |
| CA | 2338954 | 8/2001 |
| CA | 2368002 | 8/2001 |
| CA | 2408824 | 11/2001 |
| CA | 2352927 | 1/2002 |
| CA | 2353664 | 1/2002 |
| CA | 2417681 | 2/2002 |
| CA | 2442965 | 4/2002 |
| CA | 2443249 | 4/2002 |
| CA | 2369237 | 7/2002 |
| CA | 2221573 | 8/2002 |
| CA | 2364723 | 8/2002 |
| CA | 2364781 | 8/2002 |
| CA | 2441330 | 10/2002 |
| CA | 2385205 | 11/2002 |
| CA | 2423187 | 11/2002 |
| CA | 2394454 | 3/2003 |
| CA | 2459377 | 3/2003 |
| CA | 2423498 | 9/2003 |
| CA | 2509699 | 7/2004 |
| CA | 2515895 | 8/2004 |
| CA | 2469106 | 11/2004 |
| CA | 2469693 | 12/2004 |
| CA | 2530471 | 2/2005 |
| CA | 2544592 | 5/2005 |
| CA | 2491190 | 8/2005 |
| CA | 2591942 | 7/2006 |
| CA | 2593476 | 7/2006 |
| CA | 2207544 | 10/2006 |
| CA | 2620452 | 2/2007 |
| CA | 2189235 | 3/2007 |
| CA | 2620682 | 3/2007 |
| CA | 2184744 | 6/2007 |
| CA | 2658970 | 12/2007 |
| CA | 2674053 | 7/2008 |
| CA | 2679037 | 7/2008 |
| CA | 2645610 | 5/2009 |
| CA | 2670145 | 12/2009 |
| CA | 2746026 | 7/2010 |
| CA | 2770878 | 3/2011 |
| CA | 2784412 | 6/2011 |
| CA | 2784438 | 6/2011 |
| CA | 2821074 | 6/2012 |
| CN | 100344441 C | 10/2007 |
| CN | 101735492 A | 6/2010 |
| CN | 102585349 A | 7/2012 |
| EP | 2138535 | 12/2011 |
| GB | 2484338 | 4/2012 |
| WO | 03060002 | 7/2003 |
| WO | 2004097853 | 11/2004 |
| WO | 2005037710 | 4/2005 |
| WO | 2014032172 | 3/2014 |
| WO | 2015054779 | 4/2015 |

OTHER PUBLICATIONS

Wang, "The thermal resistance, flame retardance, and smoke control mechanism of nano MH/GF/NBR composite material", Science and Engineering of Composite Materials, vol. 21(3), pp. 309-314, First published online on Oct. 2, 2013.

English Abstract of CN101381483(A), "Method for preparing carbon nanotube-natural rubber compound material", Published on Mar. 11, 2009.

English Abstract of CN101831090(A), "High-performance natural rubber vulcanized rubber of carbon-containing nanotube, and preparation method thereof", Published on Sep. 15, 2010.

English Abstract of CN102321279(A), "Dopamine modified carbon nanotube/rubber material and preparation method hereof", Published on Jan. 18, 2012.

English abstract of CN102516608(A), "One high wear-resisting outstanding dynamic property nano rare earth inorganic substance/rubber compound materials", Published on Jun. 27, 2012.

English Abstract of JP2006083249(A), "Method for producing dispersed solution of rubber composition mixed with nano carbon", Published on Mar. 30, 2006.

(56) References Cited

OTHER PUBLICATIONS

English Abstract of JP2009046547(A), "Rubber Composition for Tire", Published on Mar. 5, 2009.
English Abstract of JP2010058740(A), "Pneumatic Tire", Published on Mar. 18, 2010.
English Abstract of JP2012126853(A), "Rubber Particulate Highly Blended Carbon Nanotubes, and Method for Producing the Same", Published on Jul. 5, 2012.
English Abstract of KR100635603(B1), "Bladder Rubbed Composition with High Heat Conductivity for Curing Tire", Published on Oct. 11, 2006.
English Abstract of KR100635604(B1), "Tire Tread Rubber Composition for Improving Wear Resistance Property", Published on Oct. 18, 2006.
English Abstract of KR100705784(B1), "Rubber Composition for Tire Apex that Comprises Base Rubber, Carbon Nanotubes and Wood Powder", Published on Apr. 3, 2007.
English Abstract of KR100827320(B1), "Belt Rubber Composition for Tire", Published on May 7, 2008.
English Abstract of KR100879219(B1), "Fabrication of Polymer/Carbon Nanotubes Nanocomposite by Latex Aggregation", Published on Jan. 16, 2009.
English Translation of CN103923423A, "Rubber Compound Resistant to Fatigue and Aging", Published on Jul. 16, 2014.
Wang, "The termal resistance, flame retardance, and smoke control mechanism of nano MH/NBR composite material", Sci Eng Compos Mater 2014; 21(3): 309-314.
English Abstract of CN1304473(C), "Natural liquid slurry with added carbon nanotube and its prepn process", published on Mar. 14, 2007.
English Abstract of CN101239801(A), "Preparation of carbon nano-tube/cement self-enhancing damping composite material damping ratio testing method", published on Aug. 13, 2008.
English Abstract of CN101418089(A), "Method for preparing natural rubber-carbon nano tube composite material by using static electricity self-assembly", published on Apr. 29, 2009.
English Abstract of CN102061015(A), "Heat conducting susceptibility latex product and preparation and method thereof", published on May 18, 2011.
English Abstract of CN102417610(A), "Graphene/carbon nanotube hybrid polymer composite material", published on Apr. 18, 2012.
English Abstract of EP2436720(A1), "Method for producing master batches containing nanoparticles", published on Apr. 4, 2012.
English Abstract of FR2945802(A1), "Carbon nanotube carpet", published on Nov. 26, 2010.
English Abstract of JP2004101958(A), "Conductive Member and Manufacturing Method Therefor", published on Apr. 2, 2004.
English Abstract of JP2004210830(A), "Elastomer Composition and Method for Producing the Same", published on Jul. 29, 2004.

Botros et al., "Effect of fiber reinforcement on thermal stability and swelling behavior of CR/NBR blends", Polymer-Plastics Technology and Engineering, vol. 39(2), pp. 393-414, Jan. 2000.
English Abstract of CN101602867(A), "Modified chloroprene rubber V band and method for preparing same", published on Dec. 16, 2009.
English Abstract of CN103923423(A), "Rubber compound resistant to fatigue and aging", published on Jul. 16, 2014.
Ryu et al., "Effects of Fiber Aspect Ratio, Fiber Content, and Bonding Agent on Tensile and Tear Properties of Short-Fiber Reinforced Rubber", KSME International Journal, vol. 15(1), pp. 35-43, Dec. 2001.
Uchiyama et al., "Friction of Short-Fiber-Reinforced Rubber on Wet Surfaces", Journal of Applied Polymer Science, vol. 95, pp. 82-89, Apr. 2005.
Wada et al., "Friction and wear of short-fibre-reinforced rubber composites under various sliding speeds and loads", Wear, vol. 162-164, pp. 930-938, Jan. 1993.
Watson et al., "Elastomer reinforcement with short Kevlar aramid fiber for wear applications", Rubber World, vol. 198(5), Aug. 2008.
Abstract Sui et al., "Preparation and Properties of Natural Rubber Composites Reinforced with Pretreated Carbon Nanotubes", Published on Apr. 16, 2008.
Abstract Yue et al., "Study on Preparation and Properties of Carbon Nanotubes/Rubber Composites", Published on Apr. 2006.
Bokobza et al., "Blends of Carbon and Multiwall Carbon Nanotubes as Reinforcing Fillers for Hydrocarbon Rubbers", Journal of Polymer Science: Part B: Polymer Physics, vol. 46, 1939-1951 (2008).
Claims of CA2193183, "Vulcanisable Rubber Compositions for the Production of Vehicle Tyres", Published on Jun. 21, 1997.
Botros et al., "Effect of Fiber Reinforcement on Thermal Stability and Swelling Behavior of cr/nbr Blends", Polym.-Plast. Technol. Eng., 39(2), 393-414 (2000).
Cataldo et al., "A Comparative Study on the Reinforcing Effect of Aramide and PET Short Fibers in a Natural Rubber-Based Composite", Journal of Macromolecular Science, Part B: Physics, 48:1241-1251, 2009.
Mathew et al., "Hybrid Composite Based on Nanosilica, Nylon 6 Short Fibre, and Styrene Butadiene Rubber—a Study on the Effect of Fillers and Bonding Agent", Progress in Rubber, Plastics and Recycling Technology, vol. 26, No. 1, 2010.
O'Connor, "Short-Fiber-Reinforced Elastomer Composites", Rubber Chemistry and Technology, vol. 50(5), 945-958, 1977.
Praveen et al., "Synergistic effect of carbon black and nanoclay fillers in styrene butadiene rubber matrix: Development of dual structure", Composites: Part A 40 (2009) 309-316.
Bokobza et al., "Blends of Carbon Blacks and Multiwall Carbon Nanotubes as Reinforcing Fillers for Hydrocarbon Rubbers", Journal of Polymer Science Part B: Polymer Physics, vol. 46(18) 1939-1951, 2008.
Praveen et al., "Effects of nanoclay on the mechanical and damping properties of aramid short fibre-filled styrene butadiene rubber composites", Polymer International, vol. 59(2), 187-197, 2010.

RUBBER COMPOSITIONS AND USES THEREOF

The present application is a 35 USC 371 national stage entry of PCT/CA2014/000913 filed on Dec. 19, 2014 and which claims priority on U.S. 61/918,035 filed on Dec. 19, 2013. These documents are hereby incorporated by reference in their entirety.

The present disclosure relates to improvements in the field of chemistry applied to rubber compositions. For example, such rubber compositions can be useful for preparing various articles for example used in the field of oil and gas industry as well as in the field of mining industry.

So far, rubber compositions have been developed for uses made under difficult or harsh conditions. This is the case, for example, for articles used in oil and gas industries and mining industries.

Some technologies require rubber articles that show outstanding resistance properties to oil, heat, pressure and abrasion. For examples, the rubber articles can be in contact with oil and abrasives such as and at depths as far as 3000 meters down in earth.

Unfortunately, the solutions proposed so far are most of the time either too expensive or not reliable.

There would thus be a need to develop new rubber composition effective for preparing rubber articles that would exhibit better durability in presence oil and abrasives. There would also be a need to develop compositions effective for preparing rubber articles showing the same (or better) level of durability than the standard compositions but that can be made at lower costs.

There is however still a need for providing an alternative to the existing solutions for preparing rubber compositions.

According to one aspect, there is provided a rubber composition comprising:
  an elastomer;
  reinforcing fibers and/or nanometric filamentary structures; and
  a filler.

According to another aspect, there is provided a rubber composition comprising:
  an elastomer;
  reinforcing fibers and/or nanometric filamentary structures; and
  a filler,
  wherein the composition is an uncured rubber composition.

According to another aspect, there is provided a rubber composition comprising:
  an elastomer;
  reinforcing fibers and/or nanometric filamentary structures; and
  a filler,
  wherein the composition is a cured rubber composition.

According to another aspect, there is provided a rubber composition comprising:
  about 45 to about 70 wt. % of an elastomer;
  about 0.1 to about 10 wt. % of reinforcing fibers and/or nanometric filamentary structures; and
  about 15 to about 40 wt. % of a filler.

According to another aspect, there is provided a rubber composition comprising:
  about 45 to about 70 wt. % of an elastomer;
  about 0.1 to about 10 wt. % of reinforcing fibers and/or nanometric filamentary structures; and
  about 15 to about 40 wt. % of a filler.
  wherein the composition is an uncured rubber composition.

According to another aspect, there is provided a rubber composition comprising:
  about 45 to about 70 wt. % of an elastomer;
  about 0.1 to about 10 wt. % of reinforcing fibers and/or nanometric filamentary structures; and
  about 15 to about 40 wt. % of a filler.
  wherein the composition is a cured rubber composition.

According to another aspect, there is provided a rubber composition comprising:
  an elastomer comprising a rubber that comprises a polychloroprene rubber;
  reinforcing fibers and/or nanometric filamentary structures; and
  a filler.

According to another aspect, there is provided a rubber composition comprising
  an elastomer comprising a rubber that comprises a polychloroprene rubber;
  reinforcing fibers and/or nanometric filamentary structures; and
  a filler.

According to another aspect, there is provided a rubber composition comprising:
  an elastomer comprising a rubber that comprises a polychloroprene rubber;
  reinforcing fibers chosen from aramid fibers, carbon fibers, polyester fibers, glass fibers, nylon fibers and mixtures thereof, and/or nanometric filamentary structures chosen from nanowires, nanorods, nanofibers, nanoribbons, nanotubes and mixtures thereof, the nanometric filamentary structures being functionalized or unfunctionalized; and
  a filler chosen from carbon black and silica.

According to another aspect, there is provided a rubber composition comprising:
  an elastomer comprising a rubber that comprises a polychloroprene rubber;
  reinforcing fibers chosen from aramid fibers, carbon fibers, polyester fibers, glass fibers, nylon fibers and mixtures thereof, and/or nanometric filamentary structures chosen from nanowires, nanorods, nanofibers, nanoribbons, nanotubes and mixtures thereof, the nanometric filamentary structures being functionalized or unfunctionalized; and
  a filler chosen from carbon black and silica.

According to another aspect, there is provided a rubber composition comprising:
  an elastomer comprising polychloroprene;
  reinforcing fibers chosen from aramid fibers, carbon fibers, polyester fibers, glass fibers, nylon fibers and mixtures thereof, and/or nanometric filamentary structures chosen from nanowires, nanorods, nanofibers, nanoribbons, nanotubes and mixtures thereof, said nanometric filamentary structures being functionalized or unfunctionalized; and
  a filler chosen from carbon black and silica,
  wherein said composition, when cured, comprises at least one set of characteristics chosen from
  a hardness of at least 60 shore A, measured according to ASTM D-2240 and a DIN abrasion of less than 125 $mm^3$, measured according to according to ASTM D-5963 standard;

a 100% modulus of at least 300, measured according to ASTM D-412 standard and a DIN abrasion of less than 125 mm$^3$, measured according to according to ASTM D-5963 standard;

a hardness of at least 60 shore A, measured according to ASTM D-2240 and a DIN abrasion of less than 125 mm$^3$, and a wear resistance of less than 175 mg, measured according to Dupont SJE test;

a 100% modulus of at least 300, measured according to ASTM D-412 standard and a wear resistance of less than 175 mg, measured according to Dupont SJE test;

a hardness of at least 60 shore A, measured according to ASTM D-2240, a 100% modulus of at least 300, measured according to ASTM D-412 standard and a DIN abrasion of less than 125 mm$^3$, measured according to according to ASTM D-5963 standard; and a hardness of at least 60 shore A, measured according to ASTM D-2240, a 100% modulus of at least 300, measured according to ASTM D-412 standard and a a wear resistance of less than 175 mg, measured according to Dupont SJE test.

According to another aspect, there is provided a rubber composition comprising:

an elastomer comprising polychloroprene;

reinforcing fibers chosen from aramid fibers, carbon fibers, polyester fibers, glass fibers, nylon fibers and mixtures thereof, and/or nanometric filamentary structures chosen from nanowires, nanorods, nanofibers, nanoribbons, nanotubes and mixtures thereof, said nanometric filamentary structures being functionalized or unfunctionalized; and a filler chosen from carbon black and silica, wherein said composition, when cured, comprises at least one set of characteristics chosen from a hardness of at least 60 shore A, measured according to ASTM D-2240 and a DIN abrasion of less than 125 mm$^3$, measured according to according to ASTM D-5963 standard;

a 100% modulus of at least 300, measured according to ASTM D-412 standard and a DIN abrasion of less than 125 mm$^3$, measured according to according to ASTM D-5963 standard; and a hardness of at least 60 shore A, measured according to ASTM D-2240, a 100% modulus of at least 300, measured according to ASTM D-412 standard and a DIN abrasion of less than 125 mm$^3$, measured according to according to ASTM D-5963 standard.

It was found that such compositions were effective for preparing various articles at low costs. In fact, these compositions allowed for preparing articles having the desired properties for various uses, while allowing for simple preparation processes at low costs. Moreover, these compositions were found to effective for preparing rubber articles showing improved and superior characteristics over articles made by prior art compositions.

In the following drawings, which represent by way of examples only, various embodiments of the disclosure.

Further features and advantages will become more readily apparent from the following description of various embodiments as illustrated by way of examples.

The expression "nanometric filamentary structures" as used herein refers to structures having a high dipole moment when they are charged since such nanometric structures have a high aspect ratio (length/diameter), which can be, for example, above 10. For example, they have a diameter that is inferior to about 100 nm, which allows a significant increase in the local electric field at the tip or the surface of the structures, so that they can readily emit electrons by the field or Schottky emission effect.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The term "wt %" as used herein when describing an ingredient present in a composition, refers to the weight % of this ingredient based on the total weight of the composition.

For example, in the composition, the elastomer, reinforcing fibers and/or nanometric filamentary structures and filler can be substantially uniformly distributed.

For example, the elastomer can comprise a rubber that comprises, consists essentially of or consists of a polychloroprene rubber.

For example, the compositions can be cured or uncured.

For example, the reinforcing fibers can be chosen from aramid fibers, carbon fibers, polyester fibers, glass fibers, nylon fibers and mixtures thereof, and/or nanometric filamentary structures chosen from nanowires, nanorods, nanofibers, nanoribbons, nanotubes and mixtures thereof.

For example, the nanometric filamentary structures can be functionalized or unfunctionalized.

For example, the filler can be chosen from carbon black and silica, and a mixture thereof.

For example, the filler can be chosen from carbon black and silica, bis (triethoxysilylpropyl) polysulfide, and mixtures thereof.

For example, the composition can comprise about 40 to about 75 wt. % of the elastomer, about 45 to about 70 wt. % of the elastomer, about 50 to about 65 wt. % of the elastomer, about 55 to about 60 wt. % of the elastomer, about 52 to about 61 wt. % of the elastomer, about 50 to about 55 wt. % of the elastomer, about 52 to about 54 wt. % of the elastomer, about 40 to about 60 wt. % of the elastomer, about 54 to about 60 wt. %, about 57 to about 59 wt. % of the elastomer, about 40 to about 55 wt. % of the elastomer, or about 42 to about 48 wt. % of the elastomer.

For example, the composition can comprise about 0.1 to about 10 wt. %, about 0.1 to about 3 wt. %, about 0.25 to about 1.75 wt, about 1.5 to about 2.0 wt. %, about 0.5 to about 1.5 wt. %, or about 0.75 to about 1.25 wt. % of the reinforcing fibers.

For example, the composition can comprise about 0.1 to about 10 wt. %, about 0.1 to about 3 wt. %, about 0.25 to about 1.75 wt. %, about 0.5 to about 1.5 wt. % or about 0.75 to about 1.25 wt. % of the nanometric filamentary structures.

For example, the composition can comprise about 0.1 to about 10 wt. % of the reinforcing fibers and/or nanometric filamentary structures.

For example, the composition can comprise about 0.5 to about 10 wt. % of the reinforcing fibers and/or nanometric filamentary structures.

For example, the composition can comprise about 1 to about 5 wt. of the reinforcing fibers and/or nanometric filamentary structures.

For example, the composition can comprise about 1 to about 3 wt. % of the reinforcing fibers and/or nanometric filamentary structures.

For example, the nanometric filamentary structures can comprise nanowires, nanorods, nanofibers, nanoribbons, nanotubes or bundles thereof, or mixtures thereof.

For example, the nanometric filamentary structures can comprise functionalized nanowires, functionalized nanorods, functionalized nanofibers, functionalized nanoribbons, functionalized nanotubes or bundles thereof, or mixtures thereof.

For example, the nanometric filamentary structures can be chosen from single-wall carbon nanotubes (SWCNT), functionalized single-wall carbon nanotubes, multi-wall carbon nanotubes (MWCNT), functionalized multi-wall carbon nanotubes, carbon nanometric fibres, functionalized carbon nanometric fibres and mixtures thereof.

For example, the nanometric filamentary structures can comprise a member chosen from of C, BN, B, Si, Ge, Bi, Sn, Te, Se, Hg, $Si_3N_4$, $V_2O_3$, $MX_2$ wherein M is Ti, Zr, Hf, Nb, Ta, Mo, W or Re and X is S, Se or Te, InP, InAs, GaN, GaP, GaAs, $Ga_2O_3$, ZnO, $In_2O_3$, $Na_2V_3O_7$, $Al_2O_3$, $B_2O_3$, MgO, CdO, $SiO_2$, $SnO_2$, CuO, $(SN)_x$, $Cu_2S$, $B_xC_yN_z$, $NiCl_2$, InS, ZnS, ZnSe, CdS, CdSe, $Ag_2Se$, SiC, $B_4C$, $M_2MoX_6$ wherein M is Li or Na and X is Se or Te, coated structures thereof and mixtures thereof.

For example, the aramid fibers can be short or long. For example, the aramid fibers can be in pulp or milled form.

For example the aramid fibers can be Twaron™ or Kevlar™.

For example, the rubber compositions of the disclosure can be used in the manufacture of various rubber articles including tracks, pneumatics, strips, sheets, bands, belts, hoses, linings, gaskets, guides, drive lugs, guide lugs, transmission belts, conveyor belts, a part of a pumping system, a powersection stator, etc.

For example, the composition can comprise about 10 to about 40 wt. %, about 15 to about 25 wt. %, about 20 to about 35 wt. %, about 25 to about 32 wt %, about 20 to about 25 wt % or about 26 to about 30 wt. % of the filler.

For example, the elastomer can comprise a polychloroprene rubber.

For example, the elastomer can consist essentially of a polychloroprene rubber.

For example, the elastomer can consist of a polychloroprene rubber.

For example, the composition can comprise reinforcing fibers that are aramide fibers.

For example, the composition can comprises nanometric filamentary structures that are carbon nanotubes. The carbon nanotubes can be functionalized or not.

For example, the carbon nanotubes can be multi-wall carbon nanotubes.

For example, the carbon nanotubes can be single-wall carbon nanotubes.

For example, the composition can further comprise a cross-linking agent. For example, the cross-linking agent can comprise sulphur.

For example, the composition can further comprise a cross-linking agent chosen from sulphur, metal oxides and peroxides.

For example, the composition can comprise about 0.5 to about 13.0%, about 0.5 to about 12.0%, about 8 to about 11%, about 0.5 to about 3.0% or about 0.5 to about 2.0% of the cross-linking agent. For example, the composition can comprise about 8 to about 10% of the cross-linking agent.

For example, the cross-linking agent can be a metal oxide such as red lead.

For example, the composition can further comprise a plastifier.

For example, the plastifier can comprise high aromatic oil, naphtenic oil, parrafinic oil, adipates, phtalates, sebacates and mixtures thereof.

For example, the composition can comprise about 1 to about 10% or about 2 to about 7% of the plastifier.

For example, the composition can comprise about 1 to about 20% or about 2 to about 15% of the plastifier.

For example, the composition can further comprise an anti-aging agent.

For example, the anti-aging agent can comprise 1,2-dihydro-2,2,4-trimethylquinoloine, n-cyclohexyl-n'phenyl-p-phenylenediamine, zincmethylmercaptobenzimidazole, n-isopropyl-n'-phenyl-p-phenylenediamine(ippd), wingstay 100, n,n'-bis-(1 ethyl.3.meothyl pentyl)-p-phenylffnedilsne, n-1,3-dimethylbutyl-n'-phenyli-p-phenylenedlamlne, octylated diphenylamine, n,n'-dyphenyl-p-phenylenedlamine, 4,4'-Bis-(a,a'-dimethylbenzyl) diphenylamine ble 75, or mixtures thereof.

For example, the composition can comprise about 0.2 to about 3.0%, about 1.0 to about 3.0%, or about 1.5 to about 2.5% of the anti-aging agent.

For example, the composition can further comprise a fluidizing agent.

For example, the fluidizing agent can comprise a hydrocarbon resin a phenolic resin, a fatty acid and/or derivative thereof, a mixture of fatty acids and/or derivatives thereof, zinc soap salts, or mixtures thereof.

For example, the composition can comprise about 0.5 to about 3.0% or about 1.0 to about 2.5% of the fluidizing agent.

For example, the composition can further comprise a rubber vulcanization accelerator agent.

For example, the rubber vulcanization accelerator agent can be chosen from diphenylguanidine, (TBBS) N-tertiary butyl-2-benzothiazolesulfenamide, (TBSI) N-t-butyl-2-benzothiazolesulfenimide, benzothyazyl-2-dicyclohexyl sulfenamide, Delac MOR, (MBS: 2-(Morpholinothio) benzothiazole sulfenamide), Delac S (CBS N-Cyclohexyl-2-benzothiazolesulfenamide) DCBS (N,N-dicyclohexyl2-benzothiazolesulfenamide) MBT (2-mercaptobenzothiazole), MBTS (Dibenzothiazoledisulfide), DPG (Diphenylguanidine), ethylene thiourea, DTDM (4,4 dithiodimorpholine, TMTM (Tetramethylthiuram monosulfide), TMTD (Tetramethylthiuram disulfide), etc. and mixtures thereof.

For example, the composition can comprise about 0.2 to about 2.0%, about 0.5 to about 1.5% or about 0.75 to about 1.25% of the vulcanization accelerator agent.

For example, the composition can further comprise a retarding agent.

For example, the retarding agent can be chosen from (PVI) N-(cyclohexylthio)phthalimide, retarder SAX (salicylic acid), retarder ESEN, $_{(2\text{-}be}$ benzozoic acid, and mixtures thereof.

For example, the composition can comprise about 0.1 to about 1.0% or about 0.2 to about 0.8% of the retarding agent.

For example, the composition can further comprise a hardening agent.

For example, the hardening be an agent chosen from phenolic resin, hexamethylnetetramine, resimene (hexamethoxymethyl/n-butyl-melamine formaldehyde resin), etc. and mixtures thereof.

For example, the composition can comprise about 0.5 to about 2.5% or about 1.0 to about 2.0% of the hardening agent.

For example, the composition can further comprise a reticulation agent.

For example, the reticulation agent can be chosen from stearic acid, zinc oxide, red lead and a mixture thereof.

For example, the composition can be an uncured rubber composition.

For example, the composition can be an uncured rubber composition having a Mooney viscosity $ML_{1+4}$ 145° C. of about 10 to about 120, measured according to D-1646 standard.

For example, the composition can be an uncured rubber composition having a Mooney viscosity $ML_{1+4}$ 145° C. of about 20 to about 110, measured according to D-1646 standard.

For example, the composition can be an uncured rubber composition having a Mooney viscosity $ML_{1+4}$ 145° C. of about 20 to about 100, measured according to D-1646 standard.

For example, the composition can be an uncured rubber composition having a Mooney viscosity $ML_{1+4}$ 145° C. of about 30 to about 80, measured according to D-1646 standard.

For example, the composition can be an uncured rubber composition having a Mooney viscosity $ML_{1+4}$ 145° C. of about 30 to about 75, measured according to D-1646 standard.

For example, the composition can be an uncured rubber composition having a Mooney Scorch time t5L 145° C. of about 1.5 to about 10 minutes, measured according to ASTM D-1646 standard.

For example, the composition can be an uncured rubber composition having a Mooney Scorch time t5L 145° C. of about 1.5 to about 8 minutes, measured according to ASTM D-1646 standard.

For example, the composition can be an uncured rubber composition having a Mooney Scorch time t5L 145° C. of about 1.5 to about 6 minutes, measured according to ASTM D-1646 standard.

For example, the composition can be an uncured rubber composition having a Mooney Scorch time t5L 145° C. of about 1.5 to about 5 minutes, measured according to ASTM D-1646 standard.

For example, the composition can be an uncured rubber composition having a specific gravity of about 1.0 to about 1.7 g/mL, measured according to ASTM D-297 standard.

For example, the composition can be an uncured rubber composition having a specific gravity of about 1.1 to about 1.7 g/mL, measured according to ASTM D-297 standard.

For example, the composition can be an uncured rubber composition having a specific gravity of about 1.2 to about 1.6 g/mL, measured according to ASTM D-297 standard.

For example, the composition can be an uncured rubber composition having a specific gravity of about 1.3 to about 1.5 g/mL, measured according to ASTM D-297 standard.

For example, the composition can be a cured rubber composition.

For example, the composition can be a cured rubber composition having an elongation % of about 200 to about 650, measured according to ASTM D-412 standard.

For example, the composition can be a cured rubber composition having an elongation % of about 200 to about 600, measured according to ASTM D-412 standard.

For example, the composition can be a cured rubber composition having an elongation % of about 200 to about 575, measured according to ASTM D-412 standard.

For example, the composition can be a cured rubber composition having an elongation % of about 200 to about 560, measured according to ASTM D-412 standard.

For example, the composition can be a cured rubber composition having an elongation % of about 200 to about 550, measured according to ASTM D-412 standard.

For example, the composition can be a cured rubber composition having an elongation % of about 300 to about 500, measured according to ASTM D-412 standard.

For example, the composition can be a cured rubber composition having a 25% modulus of about 100 to about 500, measured according to ASTM D-412 standard.

For example, the composition can be a cured rubber composition having a 25% modulus of about 125 to about 450, measured according to ASTM D-412 standard.

For example, the composition can be a cured rubber composition having a 25% modulus of about 125 to about 350, measured according to ASTM D-412 standard.

For example, the composition can be a cured rubber composition having a 25% modulus of about 125 to about 300, measured according to ASTM D-412 standard.

For example, the composition can be a cured rubber composition having a 25% modulus of about 125 to about 250, measured according to ASTM D-412 standard.

For example, the composition can be a cured rubber composition having a cured rubber composition having a 100% modulus of about 300 to about 1500, measured according to ASTM D-412 standard.

For example, the composition can be a cured rubber composition having a cured rubber composition having a 100% modulus of about 400 to about 1200, measured according to ASTM D-412 standard.

For example, the composition can be a cured rubber composition having a cured rubber composition having a 100% modulus of about 500 to about 1200, measured according to ASTM D-412 standard.

For example, the composition can be a cured rubber composition having a cured rubber composition having a 100% modulus of about 700 to about 1200, measured according to ASTM D-412 standard.

For example, the composition can be a cured rubber composition having a cured rubber composition having a 100% modulus of about 800 to about 1200, measured according to ASTM D-412 standard.

For example, the composition can be a cured rubber composition having a cured rubber composition having a 300% modulus of about 1500 to about 3000, measured according to ASTM D-412 standard.

For example, the composition can be a cured rubber composition having a cured rubber composition having a 300% modulus of about 1600 to about 2800, measured according to ASTM D-412 standard.

For example, the composition can be a cured rubber composition having a cured rubber composition having a 300% modulus of about 1700 to about 2750, measured according to ASTM D-412 standard.

For example, the composition can be a cured rubber composition having a 300% modulus of about 1700 to about 2700, measured according to ASTM D-412 standard.

For example, the composition can be a cured rubber composition having a 300% modulus of about 1700 to about 2650, measured according to ASTM D-412 standard.

For example, the composition can be a cured rubber composition having a 300% modulus of about 1700 to about 2600, measured according to ASTM D-412 standard.

For example, the composition can be a cured rubber composition comprising a hardness of about 60 to about 75 shore A, measured according to ASTM D-2240 and a DIN abrasion of about 80 to about 100 $mm^3$, measured according to according to ASTM D-5963 standard.

For example, the composition can be a cured rubber composition comprising a 100% modulus of about 700 to about 1100, measured according to ASTM D-412 standard and a DIN abrasion of about 80 to about 100 $mm^3$, measured according to according to ASTM D-5963 standard.

For example, the composition can be a cured rubber composition comprising a hardness of about 60 to about 75 shore A, measured according to ASTM D-2240 and a DIN abrasion of about 80 to about 100 $mm^3$, and a wear resistance of about 50 to about 150 mg, measured according to Dupont SJE test;

For example, the composition can be a cured rubber composition comprising a 100% modulus of about 700 to about 1100, measured according to ASTM D-412 standard and a wear resistance of about 50 to about 150 mg, measured according to Dupont SJE test.

For example, the composition can be a cured rubber composition comprising a hardness of about 60 to about 75 shore A, measured according to ASTM D-2240, a 100% modulus of about 700 to about 1100, measured according to ASTM D-412 standard and a DIN abrasion of about 80 to about 100 $mm^3$, measured according to according to ASTM D-5963 standard.

For example, the composition can be a cured rubber composition comprising a hardness of about 60 to about 75 shore A, measured according to ASTM D-2240, a 100% modulus of about 700 to about 1100, measured according to ASTM D-412 standard and a wear resistance of about 50 to about 150 mg, measured according to Dupont SJE test.

For example, the composition can be a cured rubber composition comprising a hardness of about 60 to about 75 shore A, measured according to ASTM D-2240.

For example, the composition can be a cured rubber composition comprising a 100% modulus of about 700 to about 1100, measured according to ASTM D-412 standard.

For example, the composition can be a cured rubber composition comprising a DIN abrasion of about 80 to about 100 $mm^3$.

For example, the composition can be a cured rubber composition comprising a wear resistance of about 50 to about 150 mg, measured according to Dupont SJE test.

According to another aspect, there is provided a method of manufacturing a composition as defined in the present disclosure. The method comprises:
  mixing together the elastomer and the reinforcing fibers and/or nanometric filamentary structures to obtain a first mixture;
  mixing together the first mixture with the filler so as to obtain a second mixture; and
  mixing together the second mixture with a crosslinking agent.

According to another aspect, there is provided a method of manufacturing a composition as defined in the present disclosure. The method comprises:
  mixing together the elastomer and the reinforcing fibers and/or nanometric filamentary structures to obtain a first mixture;
  mixing together the first mixture with the filler and optionally an anti-aging agent so as to obtain a second mixture; and
  mixing together the second mixture with a crosslinking agent, optionally an hardening agent, and optionally a vulcanization accelerator agent.

According to another aspect, there is provided an article comprising a rubber composition as defined in the present disclosure.

According to another aspect, there is provided a method for manufacturing an article comprising rubber, the method comprising using a rubber composition as defined in the present disclosure when moulding, extruding and/or calendering the article.

For example, the method can comprise calendering and/or extruding the rubber composition so as to obtain a rubber band, a rubber strip, a rubber log or a rubber sheet; and moulding and vulcanizing the a rubber band, a rubber strip, a rubber lug or a rubber sheet so as to obtain the article.

For example, the method can comprise calendering and/or extruding the rubber composition so as to obtain is a rubber band, a rubber strip, a rubber log or a rubber sheet; and moulding and vulcanizing a plurality of rubber bands, rubber strips, rubber lugs or rubber sheets so as to obtain the article.

For example, the moulding can be carried out by compression moulding.

For example, the article can be a rubber band, a rubber strip or a rubber sheet.

For example, the article can be a track for use on a vehicle.

For example, the article can be a snowmobile track.

For example, the article can be a tractor track.

For example, the article can be a tank track.

For example, the track can be an endless track.

For example, the article can be a tire.

For example, the article can be a gasket.

For example, the article can be a hose.

For example, the article can be a transmission belt.

For example, the article can be a tank lining.

For example, the article can be a part of a pumping system.

For example, the article can be a rubber band, a rubber strip, a rubber lug, a rubber belt or a rubber sheet.

For example, the article can be chosen from strips, sheets, bands, belts, hoses, linings, gaskets, guides, drive lugs, guide lugs, and transmission belts.

According to another aspect, there is provided a method for manufacturing an article comprising rubber, the method comprising using a rubber composition as defined in the present disclosure when moulding, extruding and/or calendering the article.

For example, the method can comprise calendering and/or extruding the rubber composition so as to obtain a rubber band, a rubber strip, a rubber log or a rubber sheet; and moulding and vulcanizing the a rubber band, a rubber strip, a rubber lug or a rubber sheet so as to obtain the article.

For example, the method can comprise calendering and/or extruding the rubber composition so as to obtain is a rubber band, a rubber strip, a rubber log or a rubber sheet; and moulding and vulcanizing a plurality of rubber bands, rubber strips, rubber lugs or rubber sheets so as to obtain the article.

For example, the moulding can be carried out by compression moulding.

The below presented examples are non-limitative and are used to better exemplify the processes of the present disclosure.

EXAMPLE 1

Preparation of Rubber Composition 1

The ingredients use for the Composition 1 with their amount in phr-mass (g) per hundred grams of elastomer are represented in Table 1. The equivalents in % by weight is also presented. The Polychloroprene Rubber (CR) was produced by Dupont™ inc (Neoprene W). The Merge 1F819™ is a 23.5% w/w dispersion of short pulp aramid Kevlar fibers in a CR matrix processed in liquid phase by Dupont™ inc. It is a dispersion of aramid fiber. The NC 7000™ used is a high aspect ratio Multi Wall Carbon nanotube from Nanocyl™ sa with average wall diameter of 9.5 nm and with an average length of 1.5 microns. The carbon blacks grades used were produced from Continental™ inc. and corresponds to a N220 grade with an Iodine adsorption value of 120 mg/g and a DBP absorption value of 110 mL/100 g Stearic acid and red lead (PAB 1631) are used to promote reticulation of rubber during curing as well as process aids. Octamine is used as anti-aging and anti-fatigue agents to capture free radicals. Raffex 90, an highly aromatic oil, and low density polyethylene were used as plastisizers to promote fluidity and cold flexibility properties. They were supplied by Ferguson Chemicals Inc.

Tetramethylthiuram Monosulfide was used as rubber vulcanization accelerator agent. Sulfur was used as e crosslinking agent. It was supplied by Ferguson™ Chemicals Inc.

TABLE 1

Formulation of Rubber Composition 1

| Material --- phr --- (wt. %) |
| --- |
| Neoprene W (CR)--- |
| 96.660                53.85% |
| MERGE 1F819 KEVLAR Engeneered Elastomer (in CR) |
| 4.340                 2.42% |
| NC 7000 MWCNT |
| 2.000                 1.11% |
| Carbon Black N-220 |
| 8.000                 4.50% |
| Second Stage Mix |
| Masterbatch from first stage |
| Carbon Black N-220 --- 27 --- 15 |
| Raffex 90 |
| 15.000                8.36% |
| Stearic Acid--- |
| 0.500                 0.28% |
| Octylated Diphenylamine |
| 2.000                 1.11% |
| Poly AC 617 |
| 2.000                 1.11% |
| Third Stage Mix |
| Masterbatch from second stage |
| PAB 1631: |
| 20.000                11.14% |
| Tetramethylthiuram Monosulfide |
| 1.000                 0.56% |
| SOUFRE H-10 (Sulfur) |
| 1.000                 0.56% |

Mixing and Processing Method

All the mixing phases and stages were carried in a Farrell 1.5 L Banbury mixer with Tangential rotors blending the ingredients by friction with the chamber sidewall and an hydraulic ram to put pressure to the mix. It is equipped with an automated control box permitting variable mixing speeds and an accurate control over time, pressure, energy and temperature during all the mixing process. The batch produced is then processed in a Laboratory Two Roll Mill put into sheet form and then cooled down after each mix stage. If the mix is not final, it goes back to the mixer as a masterbatch for the next mixing step 24 hours later.

The first stage mix (preparation of MasterBatch 1) was carried out as follow:
1) Add NC 7000;
2) Add carbon black, polymer and Merge 1F819;
3) Mix Ram float at low speed (70 rpm) for 20 seconds;
4) Mix until temperature rise to 100 Celcius at 70 rpm;
5) Ram up;
6) Mix until temperature rise to 110 Celcius at low speed;
7) Ram Up; and
Mix until temperature rise to 130 Celcius at low speed;
8) Drop
3 minutes mixing time total, thereby obtaining MasterBatch 1

The aim of this first pass mix was to break down the viscosity of the neoprene rubber as well as to force the preliminary dispersion of MWCNT, carbon black and Kevlar which is a challenge to achieve completely. It is done at high sheer with a medium drop temperature.

The second stage mix (preparation of MasterBatch 2) was done as follows:
1) Add MasterBatch 1 and chemicals (EMERY-400/VSTEARIN (Stearic Acid); Octamine (Octylated Diphenylamine) and Poly AC 617 (Low Density Polyethylene); and rest of carbon black
2) Mix to 95 Celcius at low speed;
2) Ram up and Add Raffex (Highly aromatic oil plasticizer)
3) Mix to 130 Celcius at low speed;
4) Drop;
4 minutes mixing time total, MasterBatch 2.

The aim of this second pass is to force by high sheer the incorporation of the reinforcing carbon black and Plasticizer and to complete the dispersion of Kevlar, MWCNT and the other chemicals.

The third stage, the finalization of mixing, was perform accordingly to the following:
1) Add MasterBatch 2 and curative chemicals (TMTM (Tetramethylthiuram Monosulfide); SOUFRE H-10 (Sulfur);
2) Mix ram down 55 sec at low speed;
3) Ram up;
5) Mix to 105 Celcius at low speed;
6) Drop;
2 minutes mixing time total, thereby obtaining composition 1 (uncured).

The mixing of the finalization is done at low sheer and low temperature. It is meant to be done to finalize the dispersion of the curative agents without beginning the cure and to avoid scorching of the product.

Preparation of Rubber Composition 2

The ingredients use for the Composition 2 with their amount in phr-mass (g) per hundred grams of elastomer are represented in Table 01. The equivalents in % by weight is also presented. The Polychloroprene Rubber (CR) was produced by Dupont (Neoprene W). The Merge 1F819™ is a 23.5% w/w dispersion of short pulp aramid Kevlar fibers in a CR matrix processed in liquid phase by Dupont™ inc. It is a dispersion of aramid fiber. The NC 7000™ used is a high aspect ratio Multi Wall Carbon nanotube from Nanocyl™ sa with average wall diameter of 9.5 nm and with an average length of 1.5 microns. The carbon blacks grades used were produced from Continental™ inc. and corresponds to a N220 grade with an Iodine adsorption value of 120 mg/g and a DBP absorption value of 110 mL/100 g Stearic acid and red lead (PAB 1631) are used to promote reticulation of rubber during curing as well as process aids. Octamine is used as anti-aging and anti-fatigue agents to capture free radicals. Di-octyl phthalate (DOP), and Aflux 42M were used as plastisizers to promote fluidity and cold flexibility properties. They were supplied by Ferguson Chemicals Inc.

Tetramethylthiuram Monosulfide and 2-(Cyclohexylaminothio)benzothiazole were used as rubber vulcanization accelerator agents. Sulphur was used as e crosslinking agent. It was supplied by Ferguson™ Chemicals Inc.

TABLE 2

Formulation of Rubber Composition 2

| Material---phr---(wt. %) | |
|---|---|
| Neoprene W (CR)--- | |
| 89.944 | 51.63% |
| MERGE 1F819 KEVLAR Engeneered Elastomer (in CR) | |
| 13.059 | 7.50% |
| PRO 7000 (NC 7000 MWCNT | |
| 1.961 | 1.13% |
| Carbon Black N-220 | |
| 8.000 | 5.00% |
| Second Stage Mix | |
| Masterbatch from first stage | |
| Carbon Black N-220---27---15 | |
| DOP | |
| 10.019 | 5.75% |
| Stearic Acid--- | |
| 0.996 | 0.57% |
| Octylated Diphenylamine | |
| 1.997 | 1.15% |
| Aflux 42M | |
| 1.503 | 0.86% |
| Third Stage Mix | |
| Masterbatch from second stage | |
| PAB 1631: | |
| 17.796 | 10.22% |
| Tetramethylthiuram Monosulfide | |
| 0.500 | 0.29% |
| 2-(Cyclohexylaminothio)benzothiazole (CBS) | |
| 0.500 | 0.29% |
| SOUFRE H-10 (Sulfur) | |
| 0.996 | 0.57% |

Mixing and Processing Method

All the mixing phases and stages were carried in a Farrell 1.5 L Banbury mixer with Tangential rotors blending the ingredients by friction with the chamber sidewall and an hydraulic ram to put pressure to the mix. It is equipped with an automated control box permitting variable mixing speeds and an accurate control over time, pressure, energy and temperature during all the mixing process. The batch produced is then processed in a Laboratory Two Roll Mill put into sheet form and then cooled down after each mix stage. If the mix is not final, it goes back to the mixer as a masterbatch for the next mixing step 24 hours later.

The first stage mix (preparation of MasterBatch 1) was carried out as follow:

1) Add NC 7000;
2) Add carbon black, polymer and Merge 1F819;
3) Mix Ram float at low speed (70 rpm) for 20 seconds;
4) Mix until temperature rise to 100 Celcius at 70 rpm;
5) Ram up;
6) Mix until temperature rise to 110 Celcius at low speed;
7) Ram Up; and Mix until temperature rise to 130 Celcius at low speed;
8) Drop 3 minutes mixing time total, thereby obtaining MasterBatch 1

The aim of this first pass mix was to break down the viscosity of the neoprene rubber as well as to force the preliminary dispersion of MWCNT, carbon black and Kevlar which is a challenge to achieve completely. It is done at high sheer with a medium drop temperature.

The second stage mix (preparation of MasterBatch 2) was done as follows:

1) Add MasterBatch 1 and chemicals (EMERY-400/VSTEARIN (Stearic Acid); Octamine (Octylated Diphenylamine) and Aflux 42M; and rest of carbon black
2) Mix to 95 Celcius at low speed;
2) Ram up and DOP (plasticizer)
3) Mix to 130 Celcius at low speed;
4) Drop;

4 minutes mixing time total, MasterBatch 2.

The aim of this second pass is to force by high sheer the incorporation of the reinforcing carbon black and Plasticizer and to complete the dispersion of Kevlar, MWCNT and the other chemicals.

The third stage, the finalization of mixing, was perform accordingly to the following:

1) Add MasterBatch 2 and curative chemicals (TMTM (Tetramethylthiuram Monosulfide) and CBS (2-(Cyclohexylaminothio)benzothiazole); SOUFRE H-10 (Sulfur);
2) Mix ram down 55 sec at low speed;
3) Ram up;
5) Mix to 105 Celcius at low speed;
6) Drop;

2 minutes mixing time total, thereby obtaining composition 1 (uncured).

The mixing of the finalization is done at low sheer and low temperature. It is meant to be done to finalize the dispersion of the curative agents without beginning the cure and to avoid scorching of the product.

EXAMPLE 2

Use of Rubber Composition 1 for Preparing Articles

The resulting uncured rubber Composition 1 can then be transformed in sheet form, profiles or lugs using a—two, three or four roll—calendar or an extruder equipped with a perform die, a roller head or without. The preformed material—for example a calendered uncured rubber sheet rolled of 15"×0.120"—may then be used downstream in the production process to be assembled uncured with other layers of itself, layers of other rubber compounds with different properties (hardness) and along with other reinforcing non rubber material, using the natural tack of the rubber or with the use of adhesives or tack cement. It is then cured in a final product by compression moulding, injection, transfer or autoclave. This operation comprises heating the rubber under a certain temperature (about 140° C. to about 180° C.) to make the sulphur creates crosslinks between polymer chains—the curing process that gives to the rubber its final stable elastic properties—at high pressure to remove gas in a product form directed by the moulds form. For example, these products can be used to in the manufacture of hoses, tank liners, power section stators designed for oil and gas prospection applications, but it may also be used to manufacture rubber pieces for other applications, like the mining industry, tank lining, tires (of all kind and sizes), hoses, gaskets and all other rubber goods.

These compositions can thus be used, for example, in oil sands pipes. The interior of the pipes is covered with a rubber liner that must be resistant to the immersion in oil as well as being resistant to excessive wear and abrasion. In addition, for powers stator applications, the resistance to excessive heat and pressure due to deep ground forencing. The compositions of the present disclosure improve drastically all of them and moreover the final field performance. It is likely to do the same for all highly demanding applications were thermal, oil, chuncking and wear resistance like OTR tires, mining ball mills and conveyors, specialty hoses, etc.

EXAMPLE 3

Preparation of Various Rubber Compositions

Similarly to Compositions 1 and 2, previously discussed, other compositions (Compositions 3 and 4 as well as a reference Composition A) have been prepared by using the same method. Their components are listed in Table 3 below.

TABLE 3

Ingredients of Various Rubber Composition

| Trade Name | Chemical Formula | Composition-A (CR 100, oil sands compound - Reference) % in compound P/P | Composition-1 (CR 100, CNT, Kevlar, oil sands compound) % in compound P/P | Composition-2 (CR 100, CNT, Kevlar, oil sands compound) % in compound P/P | Composition-3 (CR 100, Kevlar oil sands compound) % in compound P/P | Composition-4 (CR 100, Kevlar, oil sands compound) % in compound P/P |
|---|---|---|---|---|---|---|
| Neoprene W | Polychloroprene Rubber (CR) | 53.92% | 53.85% | 51.63% | 55.62% | 47.80% |
| Neoprene WRT Merge 1F819 | KEVLAR Engeneered Elastomer (in CR) | | 2.42% | 7.50% | 3.82% | 12.49% |
| PRO 7000 | NC 7000 MWCNT | | 1.11% | 1.13% | | |
| Carbon Black N-220 | Carbon Black | | 19.50% | 20.05% | 20.50% | 20.05% |
| Carbon Black N-234 | Carbon Black | 16.18% | | | | |
| Newsil 155FFG | Precipited silica | 2.70% | | | | |
| Pulpro white 10 | calcium Carbonate | 5.43% | | | | |
| Raffex 90 | High Aromatic Oil | | 8.36% | | | |
| DOP | Di-Octyl-phtalate | 5.43% | | 5.75% | 5.83% | 5.72% |
| PAB 1631 | Red Lead | 10.38% | 11.14% | 10.22% | 10.43% | 10.22% |
| Stearic Acid | Stearic acid | 0.54% | 0.28% | 0.57% | 0.58% | 0.57% |
| Octamine | Octylated Diphenylamine | 1.08% | 1.11% | 1.15% | 1.17% | 1.15% |
| Poly AC 617 | Low Density Polyethylene | | 1.11% | | | |
| Aflux 42M/ Struktol W34 | Mixture of dark Hydrocarbon Resins | 0.81% | | 0.86% | 0.88% | 0.86% |
| TMTM | Tetramethylthiuram Monosulfide | 0.27% | 0.56% | 0.29% | 0.29% | 0.29% |
| CBS | 2-(Cyclohexylamino-thio)benzothiazole | 0.27% | | 0.29% | 0.29% | 0.29% |
| Flow Cal 85 CPS | Oxide de Calcium | 2.17% | | | | |
| Sulphur | Sulphur | 0.81% | 0.56% | 0.57% | 0.58% | 0.57% |
| Total | | 100.00% | 100.00% | 100.00% | 100.00% | 100.00% |

EXAMPLE 4

Comparative Tests for Various Rubber Compositions

Composition A and Compositions 1 to 4 have been tested. The physical properties of Composition A and Compositions 1 to 4 are listed in Table 4.

TABLE 4

Physical Properties of Various Rubber Compositions
Physical and dynamic properties

| Tests | Compounds | | | | |
|---|---|---|---|---|---|
| | Composition A | Composition 1 | Composition 2 | Composition 3 | Composition 4 |
| Hardness (shore A) | 62 | 65 | 75 | 65 | 74 |
| Specific Gravity (g/mL) | 1,467 | 1,403 | 1,403 | 1,397 | 1,391 |

TABLE 4-continued

Physical Properties of Various Rubber Compositions
Physical and dynamic properties

| Tests | Composition A | Composition 1 | Composition 2 | Composition 3 | Composition 4 |
|---|---|---|---|---|---|
| Tensile (psi) | 2869 | 2885 | 2571 | 2874 | 2521 |
| Elongation (%) | 408 | 512 | 298 | 395 | 312 |
| Modulus 25% | 144 | NA | 228 | 164 | 509 |
| Modulus 50% | 213 | NA | 507 | 314 | 1230 |
| Modulus 75% | 280 | NA | 838 | 539 | 1568 |
| Modulus 100% | 373 | 740 | 1033 | 476 | 1601 |
| Modulus 300% | 1931 | 1754 | 2571 | 2146 | 2456 |
| Tear (lbs, die C) | 193 | 301 | 280 | 276 | 317 |
| MDR 191C ML | 0.95 | 1.55 | 1.74 | 1.15 | 1.41 |
| MDR 191C t10 | 0.68 | 0.54 | 0.57 | 0.64 | 0.65 |
| MDR 191C t90 | NA | 3.24 | NA | NA | NA |
| MDR 191C t95 | 3.46 | NA | 3.34 | 3.36 | 3.37 |
| MDR 191C MH | 15.02 | 13.42 | 16.15 | 13.04 | 14.98 |
| Viscosity ML 145C | 35 | 41 | 50 | 36 | 43 |
| Scorch T-5 145C | 3.5 | 3.25 | 2.1 | 2.94 | 3.23 |
| DIN Abrasion (mm3) | 137 | 100 | 89 | 97 | 108 |
| Dupont SJE Test (mg) | 277 | NA | 127 | 101 | 235 |

Specific Gravity has been measured according to ASTM D-297 standard. Hardness has been measured according to ASTM D-2240 standard with a Bareiss Durometer. Tensile strength, elongation at break and modulus has been measured according to ASTM D-412 standard with a TensiData tensiometer. Tear propagation strength was measured according to ASTM standard D-624 die C with a TensiData tensiometer.

MDR and viscosimetry have been tested using standards ASTM D-5289 and D-1646 respectively. The aim of these tests are to understand the processing behaviour of the uncured rubber paste to optimise calendering and extrusion as well as to understand and control the curing kinetics (slow curing or fast curing) during mould vulcanization.

DIN abrasion test has been evaluated with a Bareiss DIN abrader instrument according to ASTM D-5963 method and was meant to measure the resistance of the material to wear with the presence of sands and mud. Heat aging have been tested using standard ASTM D-573 to measure the deterioration of the rubber into a hot air oven at 100° C. for a period of time of 70 hours. The aim of this test was to evaluate the thermal resistance and aging properties of the composition. Such a property is quite important to powersection stators application.

Dupont SJE test has been performed at the Kingston, Ontario Dupont laboratories. It was meant to measure the resistance of the material to wear with the presence of slurry sand. It is a very aggressive test were silicium carbide water dispersion (SiC) is projected on a cured rubber plate at high velocity for a defined period of time. The material mass loss is then measured and correlated to the resistance of the material to erosion. Compositions having high hardness and modulus usually show mediocre results in this test. Composition 2, even with a high modulus performed very well into that test It can be seen from Table 4 that an increase in terms of hardness and modulus was observed for Compositions 1 and 2 i.e. reinforcement—without significantly losing another properties. With regular reinforcing agents, as hardness and modulus increase, Slurry Jet Erosion (SJE) resistance decreases. As for example, Composition 3 is a performing compound with low amount of Kevlar Fiber without MWCNT. The hardness and modulus are low and the amount of material eroded in SJE is low. In comparison, Composition 4 is the exact same one as Composition 3, but with the difference that the amount of Kevlar is significantly higher. Thus, the modulus and hardness are much higher, and the SJE resistance is lower, which is normal when a compound is rigidified. However, Composition 2 exhibits high hardness and very high modulus and should have normally demonstrated lower SJE results. However, it was unexpectedly not the case. In fact, there is a synergetic reinforcement with carbon black, aramid fiber and MWCNT that reinforces the elastomer without rididifying it. The material is stronger and keep its flexibility like it does when it is softer. There is in fact the same erosion SJE results for Composition 2 than for Composition 3, but, for Composition 2, the hardness is significantly superior i.e. 10 hardness points higher.

When comparing Composition A with the Compositions 1 and 2, one must see that Compositions 1 and 2 are similar to Composition A but they further contain PRO 7000 and Kevlar Fiber ingredient. Compositions 1 and 2 showed interesting behaviour of the materials. The fact of adding MWCNT and aramid fibers exhibit a significant increase in the hardness and modulus when performing the stress-strain test without losing much on elongation and tensile strength. The integration of these results thus show that the material with these additives are stronger and tougher. Moreover, the other physical and dynamic properties are not negatively affected by the additives. The DIN abrasion resistances as well as SJE erosion tests were significantly improved in Compositions 1 and 2 (as compared to Composition A). This was unexpected since, usually, increasing hardness and modulus with conventional means—polymers, fillers and curative chemicals—is known to be detrimental to these properties, especially abrasion resistance. Briefly, Applicants have obtained and tested tougher and more rigid materials, but that surprisingly keep the advantages of softer materials with comparable matrix elastomer. For examples, this renders such compositions particularly suitable for uses in demanding oil and gas applications were resistance to wear, heat and pressure are needed, like the powersection stators and the oil sands pipe lining.

For all these reasons, it was found that the compositions of the present disclosure were very durable in applications related to oil and gas industry and mining industry. Such compositions can thus be useful for manufacturing various rubber products used in such fields as well as in various other fields.

EXAMPLE 5

Preparation of Further Rubber Compositions

Similarly to the Compositions previously discussed, other compositions (Compositions 5 and 6) have been prepared by using the same method. Their components are listed in Table 5 below. Compositions A, 1 and 2 previously presented are also show for the purpose of comparing.

TABLE 5

Ingredients of Various Rubber Composition

| Trade Name | Chemical Formula | Composition A phr | % in compound P/P | Composition 1 phr | % in compound P/P | Composition 2 phr | % in compound P/P | Composition 5 phr | % in compound P/P | Composition 6 phr | compound P/P |
|---|---|---|---|---|---|---|---|---|---|---|---|
| Neoprene W | Polychloroprene Rubber (CR) | 100.000 | 53.92% | 96.660 | 53.85% | 89.944 | 51.63% | 94.968 | 54.45% | 94.974 | 53.87% |
| Neoprene WRT Merge 1F819 | KEVLAR Engeneered Elastomer (in CR) | | | 4.340 | 2.42% | 13.059 | 7.50% | 6.535 | 3.75% | 6.528 | 3.70% |
| PRO 7000 | NC 7000 MWCNT | | | 2.000 | 1.11% | 1.961 | 1.13% | 1.988 | 1.14% | 2.000 | 1.13% |
| Carbon Black N-220 | Carbon Black | | | 35.000 | 19.50% | 34.922 | 20.05% | 35.000 | 20.07% | 35.000 | 19.85% |
| Carbon Black N-234 | Carbon Black | 30.000 | 16.18% | | | | | | | | |
| Newsil 155FFG | Precipited silica | 5.000 | 2.70% | | | | | | | | |
| Pulpro white 10 | calcium Carbonate | 10.077 | 5.43% | | | | | | | | |
| Raffex 90 | High Aromatic Oil | | | 15.000 | 8.36% | | | | | | |
| DOP | Di-Octyl-phtalate | 10.077 | 5.43% | | | 10.019 | 5.75% | 9.961 | 5.71% | 10.000 | 5.67% |
| PAB 1631 | Red Lead | 19.252 | 10.38% | 20.000 | 11.14% | 17.796 | 10.22% | 17.976 | 10.31% | 17.800 | 10.10% |
| Stearic Acid | Stearic acid | 1.004 | 0.54% | 0.500 | 0.28% | 0.996 | 0.57% | 0.996 | 0.57% | 1.000 | 0.57% |
| Octamine | Octylated Diphenylamine | 2.003 | 1.08% | 2.000 | 1.11% | 1.997 | 1.15% | 1.998 | 1.15% | 1.997 | 1.13% |
| Koresin | Condensation product of butylphenol and acetylene | | | | | | | 1.500 | 0.86% | 2.500 | 1.42% |
| Poly AC 617 | Low Density Polyethylene | | | 2.000 | 1.11% | | | | | | |
| Struktol HPS-11 | Blend of fatty acids | | | | | | | | | 2.500 | 1.42% |
| Aflux 42M/ Struktol W34 | Mixture of dark Hydrocarbon Resins | 1.502 | 0.81% | | | 1.503 | 0.86% | 1.500 | 0.86% | | |
| TMTM | Tetramethylthiuram Monosulfide | 0.500 | 0.27% | 1.000 | 0.56% | 0.500 | 0.29% | 0.500 | 0.29% | 0.500 | 0.28% |
| CBS | 2-(Cyclohexylamino-thio)benzothiazole | 0.501 | 0.27% | | | 0.500 | 0.29% | 0.492 | 0.28% | 0.500 | 0.28% |
| Flow Cal 85 CPS | Oxide de Calcium | 4.022 | 2.17% | | | | | | | | |
| Sulphur | Sulphur | 1.511 | 0.81% | 1.000 | 0.56% | 0.996 | 0.57% | 1.009 | 0.58% | 0.996 | 0.56% |
| Total | | 185.45 | 100.00% | 179.50 | 100.00% | 174.19 | 100.00% | 174.42 | 100.00% | 176.30 | 100.00% |

EXAMPLE 6

Comparative Tests for Various Rubber Compositions

Composition A and Compositions 1, 2, 5 and 6 have been tested. The physical properties of Composition A and Compositions 1, 2, 5 and 6 are listed in Table 6.

TABLE 6

Physical Properties of Various Rubber Compositions

| Tests | Composition A | Composition 1 | Composition 2 | Composition 5 | Composition 6 |
|---|---|---|---|---|---|
| Hardness (shore A) | 62 | 65 | 69 | 68 | 71 |
| Specific Gravity (g/mL) | 1.467 | 1.403 | 1.403 | 1.403 | 1.411 |
| Tensile (psi) | 2869 | 2885 | 2571 | 2790 | 2900 |
| Elongation (%) | 408 | 512 | 298 | 359 | 341 |
| Modulus 25% | 144 | 259 | 228 | 217 | 254 |
| Modulus 50% | 213 | 472 | 507 | 507 | 613 |
| Modulus 75% | 280 | 640 | 838 | 806 | 945 |
| Modulus 100% | 373 | 740 | 1033 | 935 | 1072 |
| Modulus 300% | 1931 | 1754 | 2571 | 2403 | 2622 |
| Tear (lbs, die C) | 193 | 301 | 280 | 265 | 271 |
| MDR 191C ML | 0.95 | 1.55 | 1.74 | 1.7 | 1.47 |
| MDR 191C t10 | 0.68 | 0.54 | 0.57 | 0.55 | 0.49 |
| MDR 191C t95 | 3.46 | 3.24 | 3.34 | 3.30 | 3.28 |
| MDR 191C MH | 15.02 | 13.42 | 16.15 | 14.3 | 13.35 |
| Viscosity ML 145C | 35 | 41 | 50 | 49 | 48 |
| Scorch T-5 145C | 3.5 | 3.25 | 2.1 | 2.53 | 1.84 |
| DIN Abrasion (mm3) | 137 | 100 | 89 | 81 | 90 |
| Dupont SJE Test (mg) | 277 | NA | 127 | NA | 62 |

It was found that Compositions 5 and 6 are improvements over composition 3 with respect to abrasion resistance (DIN and SJE) as well as calandering and flowability. From all compositions 1-4, it was observed that Composition 3 was the best lead for abrasion resistance. Compositions 5 and 6 were added with NC 7000 MWCNT for better abrasion resistance. Koresin was introduced as a tackifiying additive in Compositions 5 and 6 to give to the rubber additional tack to help build the multilayer sheet that would not delaminate. Also better stickiness to the metal roll of the calander help to ease the process. In Composition 6, HPS-11 was added (a blend of fatty acid derivatives) to help increase the flow to ease even more the process. Regarding Compositions 5 and 6, the addition of MWCNT increased viscosity, but the tackifiyer and process aid reduced to level acceptable for the process (48-49 Mooney). Also the DIN abrasion was significantly improved due to the addition of MWCNT (from 97 mm3 to 90 mm3) (see Compositions 5 and 6 as compared to Composition 3). It is even more remarkable with the SJE abrasion test (from 101 mm3 to 62 mm3) (see Composition 3 vs Composition 6). For Compositions 5 and 6, the modulus 100% of 935 lbs to 1072 lbs is significantly greater than 476 lbs for Composition 3, which shows that the material tougher and more rigid. This is excellent for these compositions that can be used, for example, in those demanding oil and gas applications were resistance to wear, heat and pressure are needed, like the power section stators and the oil sands pipe lining.

While a description was made with particular reference to the specific embodiments, it will be understood that numerous modifications thereto will appear to those skilled in the art. Accordingly, the above description and accompanying drawings should be taken as specific examples and not in a limiting sense.

What is claimed is:

1. A rubber composition comprising:
   about 40 to about 75 wt. % of an elastomer comprising polychloroprene;
   about 0.1 to about 10 wt. % of reinforcing fibers that are aramid fibers;
   about 0.1 to about 10 wt. % of nanometric filamentary structures that are carbon nanotubes, said nanometric filamentary structures being functionalized or unfunctionalized; and
   about 15 to about 40 wt. % of a filler selected from the group consisting of carbon black and silica,
   wherein said composition, when cured, comprises at least one set of characteristics selected from the group consisting of
   a hardness of at least 60 shore A, measured according to ASTM D-2240 and a DIN abrasion of less than 125 mm$^3$, measured according to according to ASTM D-5963 standard;
   a 100% modulus of at least 300 psi, measured according to ASTM D-412 standard and a DIN abrasion of less than 125 mm$^3$, measured according to according to ASTM D-5963 standard;
   a hardness of at least 60 shore A, measured according to ASTM D-2240 and a DIN abrasion of less than 125 mm$^3$, and a wear resistance of less than 175 mg, measured according to Dupont SJE test;
   a 100% modulus of at least 300 psi, measured according to ASTM D-412 standard and a wear resistance of less than 175 mg, measured according to Dupont SJE test;
   a hardness of at least 60 shore A, measured according to ASTM D-2240, a 100% modulus of at least 300 psi, measured according to ASTM D-412 standard and a DIN abrasion of less than 125 mm$^3$, measured according to according to ASTM D-5963 standard; and
   a hardness of at least 60 shore A, measured according to ASTM D-2240, a 100% modulus of at least 300 psi, measured according to ASTM D-412 standard and a wear resistance of less than 175 mg, measured according to Dupont SJE test.

2. The composition of claim 1, wherein said composition comprises about 45 to about 70 wt. % of said elastomer.

3. The composition of claim 1, wherein said composition comprises about 54 to about 60 wt. % of said elastomer.

4. The composition of claim 1, wherein said composition comprises about 50 to about 55 wt. % of said elastomer.

5. The composition of claim 1, wherein said composition comprises about 45 to about 55 wt. % of said elastomer.

6. The composition of claim 2, wherein said composition comprises about 1.5 to about 10 wt. % of said reinforcing fibers.

7. The composition of claim 2, wherein said composition comprises about 1.5 to about 2.0 wt. % of said reinforcing fibers.

8. The composition of claim 1, wherein said composition comprises about 0.25 to about 1.75 wt. % of said nanometric filamentary structures.

9. The composition of claim 6, wherein said composition comprises about 0.5 to about 1.5 wt. % of said nanometric filamentary structures.

10. The composition of claim 1, wherein said composition comprises about 0.1 to about 10 wt. % of said reinforcing fibers and/or nanometric filamentary structures.

11. The composition of claim 2, wherein said composition comprises about 0.5 to about 10 wt. % of said reinforcing fibers and/or nanometric filamentary structures.

12. The composition of claim 11, wherein said composition comprises about 15 to about 25 wt. % of said filler.

13. The composition of claim 9, wherein said composition, when cured, comprises at least one set of characteristics selected from the group consisting of
- a hardness of at least 60 shore A, measured according to ASTM D-2240 and a DIN abrasion of less than 125 mm$^3$, measured according to according to ASTM D-5963 standard;
- a 100% modulus of at least 300 psi, measured according to ASTM D-412 standard and a DIN abrasion of less than 125 mm$^3$, measured according to according to ASTM D-5963 standard; and
- a hardness of at least 60 shore A, measured according to ASTM D-2240, a 100% modulus of at least 300 psi, measured according to ASTM D-412 standard and a DIN abrasion of less than 125 mm$^3$, measured according to according to ASTM D-5963 standard.

14. The composition of claim 1, wherein said composition, when cured, comprises a hardness of at least 60 shore A, measured according to ASTM D-2240 and a DIN abrasion of less than 125 mm$^3$, measured according to according to ASTM D-5963 standard.

15. The composition of claim 1, wherein said composition, when cured, comprises a 100% modulus of at least 300 psi, measured according to ASTM D-412 standard and a DIN abrasion of less than 125 mm$^3$, measured according to according to ASTM D-5963 standard.

16. The composition of claim 1, wherein said composition, when cured, comprises a hardness of at least 60 shore A, measured according to ASTM D-2240, a 100% modulus of at least 300 psi, measured according to ASTM D-412 standard and a DIN abrasion of less than 125 mm$^3$, measured according to according to ASTM D-5963 standard.

17. The composition of claim 1, wherein said composition, when cured, comprises a hardness of about 60 to about 75 shore A, measured according to ASTM D-2240 and a DIN abrasion of about 80 to about 100 mm$^3$, measured according to according to ASTM D-5963 standard.

18. The composition of claim 1, wherein said composition, when cured, comprises a 100% modulus of about 700 psi to about 1100 psi, measured according to ASTM D-412 standard and a DIN abrasion of about 80 to about 100 mm$^3$, measured according to according to ASTM D-5963 standard.

19. The composition of claim 1, wherein said composition, when cured, comprises a hardness of about 60 to about 75 shore A, measured according to ASTM D-2240 and a DIN abrasion of about 80 to about 100 mm$^3$, and a wear resistance of about 50 to about 150 mg, measured according to Dupont SJE test.

20. The composition of claim 1, wherein said composition, when cured, comprises a 100% modulus of about 700 psi to about 1100 psi, measured according to ASTM D-412 standard and a wear resistance of about 50 to about 150 mg, measured according to Dupont SJE test.

21. The composition of claim 1, wherein said composition, when cured, comprises a hardness of about 60 to about 75 shore A, measured according to ASTM D-2240, a 100% modulus of about 700 psi to about 1100 psi, measured according to ASTM D-412 standard and a DIN abrasion of about 80 to about 100 mm$^3$, measured according to according to ASTM D-5963 standard.

22. The composition of claim 1, wherein said composition, when cured, comprises a hardness of about 60 to about 75 shore A, measured according to ASTM D-2240, a 100% modulus of about 700 psi to about 1100 psi, measured according to ASTM D-412 standard and a wear resistance of about 50 to about 150 mg, measured according to Dupont SJE test.

* * * * *

UNITED STATES PATENT AND TRADEMARK OFFICE
CERTIFICATE OF CORRECTION

PATENT NO. : 9,663,640 B2  
APPLICATION NO. : 15/035095  
DATED : May 30, 2017  
INVENTOR(S) : Bédard et al.

It is certified that error appears in the above-identified patent and that said Letters Patent is hereby corrected as shown below:

In the Claims

Claim 1, Column 22, Line 31, "measured according to according to ASTM" should read -- measured according to ASTM --;

Claim 1, Column 22, Line 35, "measured according to according to ASTM" should read -- measured according to ASTM --;

Claim 1, Column 22, Line 48, "measured according to according to ASTM" should read -- measured according to ASTM --;

Claim 13, Column 23, Line 20, "measured according to according to ASTM" should read -- measured according to ASTM --;

Claim 13, Column 23, Line 24, "measured according to according to ASTM" should read -- measured according to ASTM --;

Claim 13, Column 23, Line 30, "measured according to according to ASTM" should read -- measured according to ASTM --;

Claim 14, Column 23, Lines 34-35, "measured according to according to ASTM" should read -- measured according to ASTM --.

Signed and Sealed this  
Twentieth Day of February, 2018

Andrei Iancu  
*Director of the United States Patent and Trademark Office*